UNITED STATES PATENT OFFICE.

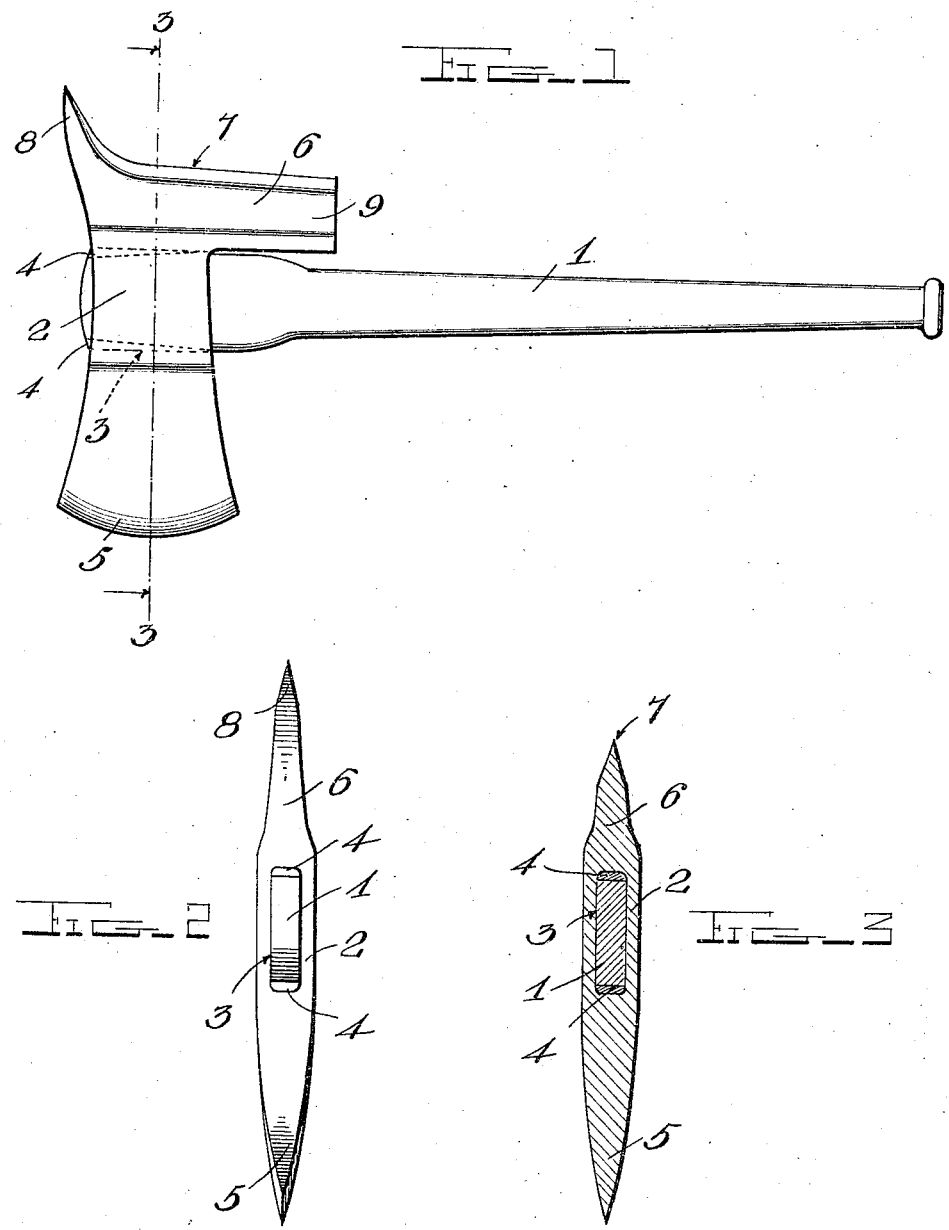

CHARLES E. OLSON, OF EVERETT, WASHINGTON.

COMBINED BRUSH-HOOK AND AX.

934,008.

Specification of Letters Patent. Patented Sept. 14, 1909.

Application filed October 22, 1908. Serial No. 458,996.

*To all whom it may concern:*

Be it known that I, CHARLES E. OLSON, a citizen of the United States, residing at Everett, in the county of Snohomish and State of Washington, have invented certain new and useful Improvements in Combined Brush-Hooks and Axes; and I do declare the following to be a full, clear, and exact description of the invention, such as will enable others skilled in the art to which it appertains to make and use the same.

My invention relates to woodman's tools, and particularly to axes.

In working in the woods it is necessary that the woodman carry with him a brush hook and an ax. The latter may not always be used in the capacity of a hook, and the former cannot be used as an ax.

It is the object of my invention to combine these two tools so that a woodman can clear his way to a tree with the brush hook and then fell it subsequently using the brush hook to trim the fallen tree.

With these and other objects in view, the invention consists of certain novel features of construction, combination and arrangement of parts, as will be more fully described and particularly pointed out in the appended claims.

In the accompanying drawings, Figure 1 is a side elevation; Fig. 2 is an end elevation; and, Fig. 3 is a transverse section on the line 3—3 of Fig. 1.

Referring more especially to the drawings, 1 represents the handle of the device to which is secured in the usual manner the body 2 as it passes through the aperture 3 and being secured therein by wedges 4. The body 2 is provided on one side with the usual ax bit or blade 5, and on the opposite side with a peculiarly formed brush hook blade 6 of substantially the same weight and having its sharpened edge 7, extending into a point 8, at the outer end of the device and in line with the outer edge of the ax blade. The rear part of the brush hook blade is formed into an extension 9, which is entirely separated from the handle 1. The outer side of this extension 9 has an edge which is formed as a continuation of the edge 7, and the object of the extension is to provide a device which makes it unnecessary to strike an accurate blow in cutting the brush or trimming the limbs from the tree. This extension is shown to be parallel with the handle and may be sharpened on its inner side as at 10 so as to be used in the form of a hook. Frequently when the device is being used as a brush hook, a branch or small tree will become engaged between the handle and the extension. With the edge sharpened, as at 10, the operator will not have to stop to disengage the device but can cut through the branch or tree by pulling the device which will bring the tree or limb wedgingly between the sharpened edge 10 and the handle, and thus release the device therefrom.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A device of the class described comprising a handle, an ax-blade, a brush blade, and an extension on the brush blade having a cutting edge adjacent the handle, adapted to cut branches forced into engagement therewith by the handle.

2. A device of the class described comprising a handle, an ax-blade connected thereto, a brush blade integral with the ax-blade and arranged on the opposite side of the handle, and an extension on the brush blade parallel with the handle and having a cutting edge adjacent the handle, adapted to cut branches forced into engagement therewith by the handle.

3. In a device of the class described, the combination with a handle, of a body secured thereto, an ax-blade formed on one side of the body, a brush blade formed on the opposite side of said body and having a concave cutting edge, an extension integral with the brush blade and extending parallel with the handle but free therefrom, said extension having a straight cutting edge forming a continuation of the concave cutting edge of the brush blade, and a straight cutting edge adjacent the handle, and an enlarged portion on the handle adapted to wedge a branch into engagement with the edge adjacent the handle.

In testimony whereof I have hereunto set my hand in presence of two subscribing witnesses.

CHARLES E. OLSON.

Witnesses:
 F. W. MANSFIELD,
 BENJ. W. SHERWOOD.